July 24, 1962  J. D. TURLAY  3,045,507
CRANKSHAFT
Filed Nov. 1, 1952
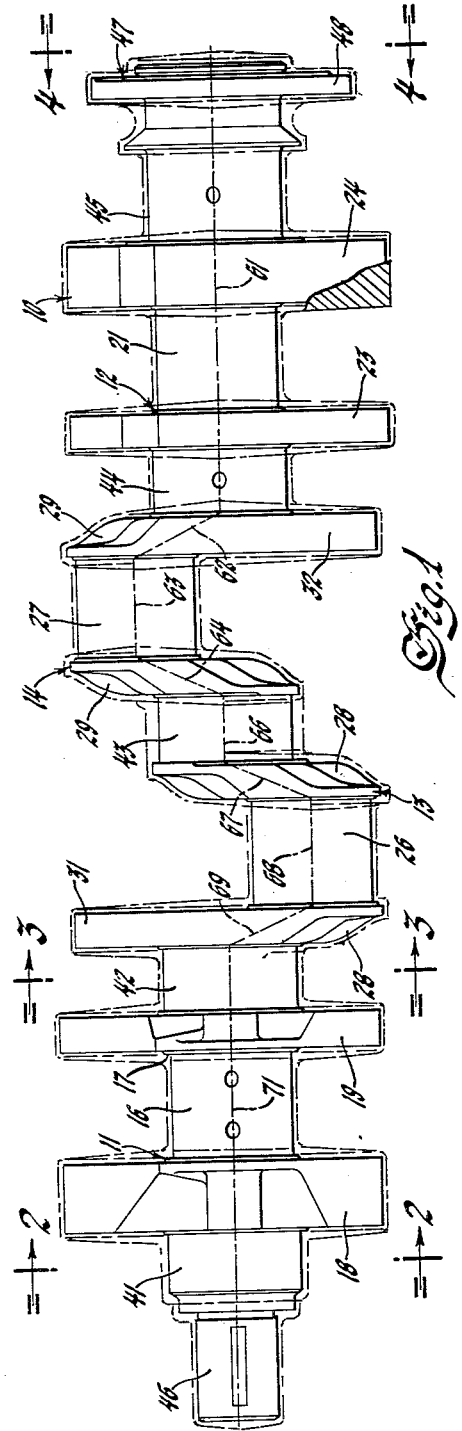
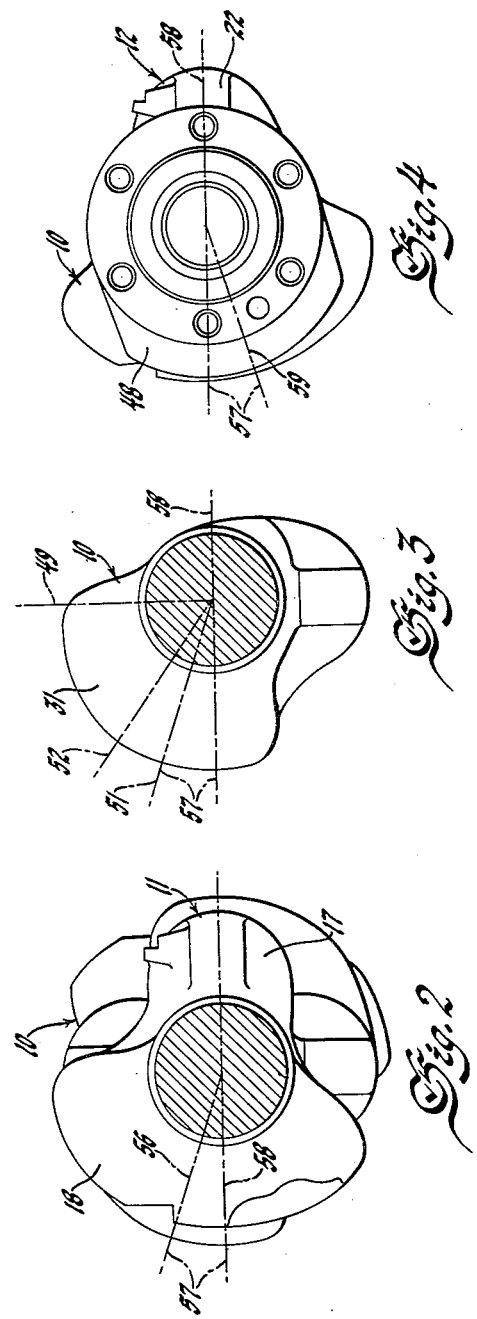
INVENTOR
Joseph D. Turlay
BY
Willito Helwig & Baillio
ATTORNEYS

United States Patent Office 3,045,507
Patented July 24, 1962

3,045,507
CRANKSHAFT
Joseph D. Turlay, Flint, Mich., assignor to General Motors Corporation, Detroit, Mich., a corporation of Delaware
Filed Nov. 1, 1952, Ser. No. 318,169
6 Claims. (Cl. 74—603)

This invention relates to crankshafts for engines and has particular relation to a statically and dynamically balanced crankshaft especially applicable for use in 90° V–8 engines for automotive and other uses.

Crankshafts as now constructed for automotive and other uses may require static and dynamic balancing. When such need arises it has been customary to compute the amount of balancing that may be required by known formula and then to design the crankshaft in such a way that the required amount of weight is added to various crank arms in opposed relation to the crankpins of these arms. The weight is generally added by forming integral counterweights of the material of which the crankshaft is formed. In order to provide this added material it is necessary under certain conditions to increase either the length or the diameter of the crankshaft or both the length and the diameter of the crankshaft.

It is now proposed to provide a crankshaft having counterweights arranged and disposed in such manner that the length and diameter of the crankshaft will not be increased to the extent heretofore required. Since the length and diameter of the crankshaft is an important factor in the size and weight of any engine it will be apparent that by using a crankshaft constructed according to the principles of the invention it will be possible to build smaller, lighter weight and more powerful engines. Also in constructing crankshafts for engines for automotive and other uses it is now the practice to position a part of the material required for balancing the intermediate crankpins, in directly opposed relation to these crankpins. The weight of the material which is added in this manner has little effect on balancing the total unbalanced force resulting from rotation of the crankshaft but it does oppose the couple formed by the crankpins on opposite sides of the center main bearing and does therefore tend to reduce the twisting forces affecting the center main bearing.

It is now proposed to employ such counterweights on the intermediate crank arms on opposite sides of the center main bearing in such an angular position that the weight of these counterweights may be employed partly in reducing the effect of the couple caused by the rotation of the intermediate crank arms and partly in counterbalancing the unbalanced forces resulting from the rotation of the entire crankshaft.

In order to decrease the overall length of the crankshaft it is also proposed to decrease the width of the counterweight between the rear main bearing and the end crankpin adjacent thereto. The loss in weight resulting from decreasing the width of this counterweight is compensated for by adding a smaller amount of weight to the corresponding side of the driving flange at the rear end of the crankshaft. Since a counterweight on this driving flange is farther from the middle of the crankshaft it is more effective in balancing the externally directed forces resulting from rotation of the crankshaft than the same amount of weight in a similar position but nearer the middle of the crankshaft.

It has been customary heretofore to forge crankshafts of this type, in a single plane and then to form the crankshaft in such a way that certain of the cranks will lie in different planes by twisting the crankshaft between the different crank arms.

It is now proposed to so form the external surface of the various cranks and counterweights and to so position the counterweights with respect to the crank arms that draft clearance will be provided on opposite sides of planes extending through different parts of the crankshaft in parallel relation to one another. It is possible either to forge or cast such a crankshaft in a single operation.

In the drawings:

FIGURE 1 is a side elevational view of a crankshaft embracing the principles of the invention.

FIGURE 2 is a cross-sectional view of the crankshaft taken substantially in the plane of line 2—2 on FIGURE 1 looking in the direction of the arrows thereon.

FIGURE 3 is another cross-sectional view of the crankshaft taken substantially in the plane of line 3—3 on FIGURE 1 and looking in the direction of the arrows thereon.

FIGURE 4 is a rear end view of the crankshaft taken substantially in the plane of line 4—4 on FIGURE 1 and looking in the direction of the arrows thereon.

The crankshaft 10 embracing the invention may comprise end crank arms 11 and 12 which are diametrically opposed to one another and in the same plane the crankshaft 10 also has intermediate crank arms 13 and 14 also diametrically opposed to one another but which lie in a plane normal to the plane of the crank arms 11 and 12. The crank arm 11 has a crankpin 16 supported by cheeks 17 at the opposite ends thereof. The cheeks 17 also project across the axis of the crankshaft and are enlarged to form counterweights 18 and 19. The crank arm 12 also has a crankpin 21 supported by cheeks 22 at the opposite ends thereof and which likewise project across the axis of the crankshaft and terminate in counterweights 23 and 24 disposed in opposed relation to the crank arm 12. The crank arms 13 and 14 have crankpins 26 and 27 respectively which likewise have cheeks 28 and 29 respectively at the opposite ends thereof. The cheeks 28 and 29 at the outer ends of the crankpins 26 and 27 respectively are likewise extended across the axis of the crankshaft to provide counterweights 31 and 32 respectively. While the crankshaft 10 may be provided with any desired number of main bearings, in the present instance the crankshaft 10 has five main bearings these being indicated by the numerals 41, 42, 43, 44 and 45. The front end of the crankshaft may be provided with a reduced end indicated at 46 to be employed for the purpose of supporting a drive pulley or gear for driving a fan, generator or other accessory, device or devices desirable on an engine with which the crankshaft may be employed. The rear end of the crankshaft 10 beyond the rear main bearing indicated at 45 may be provided with a driving flange 47 which may be employed in coupling the crankshaft 10 to the end of the driven shaft through which power from the engine may be transmitted.

The driving flange 47 is formed in such a way as to be generally concentric with respect to the axis of the shaft 10 except that a counterweight 48 is disposed on the side of the flange 47 in opposed relation to the crank arm 12.

The crank arms 11, 12, 13 and 14 are so arranged with respect to the axis of rotation of the crankshaft 10 that the crank arm 14 may follow the crank arm 11 by 90°, the crank arm 12 may follow the crank arm 14 by 90° and the crank arm 13 may follow the crank arm 12 by 90°, when the crankshaft 10 is rotated in one direction.

Considering only the crank arms and main bearings of the crankshaft 10 it will be apparent that the crankshaft without the counterweights applied thereto would be statically balanced but dynamically unbalanced. The rotation of said shaft would produce inner couples in one plane formed by the intermediate crank arms 13 and 14 and outer couples in a plane normal to the first plane and formed by the end crank arms 11 and 12. These couples may be balanced in a number of different ways.

For example, it is possible to balance these couples by applying counterweights in directly opposed relation to each of the crankpins, the axially offset relation of which results in the formation of the couples. If this is done the crankshaft will be perfectly balanced both statically and dynamically but the crankshaft will have excess weight and the excess weight will result either in increasing the length or the diameter of the crankshaft or both. It is considered preferable to consider the crankshaft as a single vibrating body the two ends of which vibrate about the middle of the crankshaft. If this is done it is possible to compute the angular position and the weight of a single counterweight that might be applied to each end of the crankshaft and which would counterbalance both the inner and outer couples resulting from the rotation of the crank arms 13 and 14 and the crank arms 11 and 12. It is the practice in all such computations not only to consider the unbalanced weight involved in each of the crank arms 11, 12, 13 and 14, but some part, generally one-half of the weight of the connecting rods, pistons, piston rings, piston pins, etc. which the crankpins operate. It is then possible to break down the resultant force at each end of the crank shaft which is required to counterbalance all of the couples involved and then to apply to each end of the crankshaft a number of weights which will produce this resultant force. In the present instance the crankshaft 10 is designed in such a way as partly to utilize both these methods of counterbalancing crankshafts.

For example it is apparent by examining FIGURE 1 that it is possible to break down the couple resulting from the rotation of the crank arms 13 and 14 into two couples. One of these couples will result from the rotation of the inner half of each of the crankpins 26 and 27 and the cheeks 28 and 29 between the crankpins 26 and 27 and the center shaft bearing 43. It will be apparent however that the distance between the center of mass of the unbalanced weight forming this couple and the middle of this crankshaft will not be very great so that it may be considered unnecessary to directly counterbalance the inner part of the couple resulting from the rotation of the crank arms 13 and 14. The outer part of this couple will result from the rotation of the outer end of each of the crankpins 26 and 27 plus the cheeks 28 and 29 at the outer ends of the crankpins 26 and 27. Since the L involved in the formula WRL as applied to this outer couple would be larger it might be advisable to directly balance the outer half of the inner couple formed by the crank arms 13 and 14. It is possible to do this directly merely by applying counterweight in diametrically opposed relation to the crankpins 26 and 27 by extending the cheeks 28 and 29 at the outer ends of the crankpins 26 and 27. It will be apparent however that while such an extension of the cheeks 28 and 29 at the outer ends of the crankpins 26 and 27 might directly balance the outer half of the inner couple formed by the crank arms 13 and 14 and might therefore greatly relieve the tendency to twist the middle part of the shaft upon the center bearing 43, it would not aid materially in counterbalancing the couples resulting from the rotation of the crank arms 11 and 12 and 13 and 14. It is therefore proposed not to locate the counterweights in directly opposed relation to the crankpins 26 and 27 but to locate these counterweights at an angle which is between a position 180° opposed to the crankpins 26 and 27 and the angular position at which a single counterweight might be located at each end of the crankshaft for counterbalancing the inner couple resulting from rotation of the crank arms 13 and 14 and the outer couple resulting from rotation of the crank arms 11 and 12. Line 49 indicates the position at which the center of mass of the counterweights 31 and 32 might be located with respect to the crankpins 26 and 27 respectively in the event the outer half of the inner couple were to be directly balanced. The line 51 indicates the position at which the center mass of the counterweights 31 and 32 might be located in the event it were considered desirable to locate the counterweights 31 and 32 at the angle at which a single counterbalancing weight might be located at each end of the crankshaft for counterbalancing the couples resulting from rotation of the crank arms 13 and 14 and the crank arms 11 and 12. The line 52 on FIGURE 3 indicates a line on which the center mass of the counterweights 31 and 32 is located according to this invention and in which instance it is desirable to relieve to some extent the twisting movement upon the center bearing 43 and at the same time to provide some part of the weight required at each end of the crankshaft in order to counterbalance the inner and outer couples resulting from the rotation of the crank arms 13 and 14, and 11 and 12. It is therefore apparent that it is possible to employ a part of the inertia forces resulting from the rotation of the counterweights 31 and 32 as a part of the system of counterweights which is employed in counterbalancing the forces resulting from the inner and outer couples involving the crank arms 13 and 14 and the crank arms 11 and 12. The system of rotating forces employed at each end of the crankshaft 10 therefore will involve the counterweights 18 and 19 and 31 at the front end of the crankshaft 10 and the system of counterweights at the rear end of the crankshaft involving the counterweights 32, 23, 24 and the counterweight 48 on the peripheral edge of the driving flange 47.

At the front end of the crankshaft 10 the center of mass of the counterweights 18 and 19 may be found to lie upon a line 56 which is disposed at an angle 57 with respect to line 58 extending across the axis of the crankshaft in diametrically opposed relation to the crank arm 11. The component of the counterweight 31 which extends along the line 51 also will be disposed at the angle 57 from line 58 which extends through the axis of the crankshaft in diametrically opposed relation to the crank arm 11 and normally with respect to the crank arm 13. The counterweights 23 and 24 which are opposed to the crank arm 12 and the counterweight 48 on the driving flange 47 also may be located at the angle 57 from the line 58 which extends across the axis of the crankshaft in diametrically opposed relation to the crank arm 12. The rotation of the counterweight 32 which is directly opposed to the counterweight 31 also has a component of force in directly opposed relation to line 51 illustrated by FIGURE 3 and which is in the plane of the line 59 on which the centers of mass of the counterweights 23, 24 and 48 are located.

By employing the counterweight 48 on the driving flange 47 it is possible to make the counterweight 24 narrower than the counterweight 18 which serves a similar purpose in the system of counterweights at the front end of the crankshaft 10. Due to the fact that the counterweight 48 is farther from the middle of the crankshaft 10 it is possible either to employ a less amount of weight in the counterweight 48 or to make the radius of gyration smaller. It will be observed that in the present instance the radius of gyration of the counterweight 48 is smaller than the radius of gyration of the counterweights 23 or 24. In any event by reducing the width of the counterweight 24 by providing the counterweight 48 it will be apparent that the rear main bearing 45 is closer to the crankpin 21 than would otherwise be the case and consequently the length of the crankshaft is reduced by this amount.

By constructing the crankshaft in this manner and by properly contouring the peripheral edges of all of the counterweights and the crank arms employed in the shaft 10 it will be apparent that it is possible to provide draft clearance or oppositely sloping and outwardly converging surfaces on all oppositely projecting parts of the crankshaft in planes normal to the crankshaft as it appears in FIGURE 1. The parting planes from which the draft clearance extends are along the dot and dash lines indicated at 61, 62, 63, 64, 66, 67, 68, 69 and 71. The plane of lines 61, 66 and 71 divide the main bearings 41, 42, 43, 44 and 45, the crank arms 11 and 12 and the counterweights 19, 19, 31, 32, 23, 24 and 48 in such a way that there is draft clearance on opposite sides of these planes. The planes of the lines 63 and 68 are disposed in parallel relation to the plane of the lines 71, 66 and 61 and through the axes of the crankpins 26 and 27. The planes of the lines 69, 67, 64 and 62 connect the various parallel planes referred to and divide the cheeks 28 and 29 of the crank arms 13 and 14 in such a way as to provide draft clearance in opposite directions from the planes of the lines 71, 68, 66, 63 and 61. By so constructing the crankshaft as to provide draft clearance on opposite sides of the planes of the lines referred to it will be apparent that it will be possible to construct dies or molds in such a way that the crankshaft may be either forged or cast.

I claim:

1. A crankshaft for engines comprising crank arms extending in opposed relation to one another in one plane and crank arms extending in opposed relation to one another in another plane, said first mentioned crank arms being formed to provide draft clearance on opposite sides of said one plane, said second mentioned crank arms being formed to provide draft clearance on opposite sides of planes on opposite sides of and parallel to said one plane and extending through the axes of the crankpins of said second mentioned crank arms and on opposite sides of planes converging obliquely away from said one plane and intersecting said one plane and said parallel planes at the ends of said crankpins of said second mentioned crank arms, said crankshaft also being formed to provide main bearing journal means formed to provide draft clearance on opposite sides of said one plane.

2. A crankshaft for engines comprising crank arms extending in opposed relation to one another in one plane and crank arms extending in opposed relation to one another in another plane, and counterweights on said crank arms for balancing unbalanced forces resulting from the rotation of said crankshaft said first mentioned crank arms and the counterweights on said first mentioned crank arms being formed to provide draft clearance on opposite sides of said one plane, said second mentioned crank arms and the counterweights on said second mentioned crank arms being formed to provide draft clearance on opposite sides of planes on opposite sides of and parallel to said one plane and extending through the axes of the crankpins of said second mentioned crank arms and on opposite sides of planes converging obliquely away from said one plane and intersecting said one plane and said parallel planes at the ends of said crankpins of said second mentioned crank arms, said crankshaft also being formed to provide main bearing journal means formed to provide draft clearance on opposite sides of said one plane.

3. A crankshaft for engines comprising end crank arms disposed adjacent the opposite ends of said crankshaft and extending in opposed relation to one another in one plane, intermediate crank arms between said end crank arms and extending in opposed relation to one another in another plane and counterweights on said crankshaft for balancing unbalanced forces resulting from the rotation of said crankshaft, said crankshaft being formed to provide draft clearance on opposite sides of said one plane and on opposite sides of planes parallel to said one plane and extending through the axes of the crankpins of said intermediate crank arms and on opposite sides of planes converging obliquely away from said one plane and intersecting said one plane and said parallel planes at the ends of said crankpins of said intermediate crank arms, said crankshaft also being formed to provide main bearing journal means formed to provide draft clearance on opposite sides of said one plane.

4. A crankshaft for engines comprising end crank arms disposed adjacent the opposite ends of said crankshaft and extending in opposed relation to one another in one plane, intermediate crank arms between said end crank arms and extending in opposed relation to one another in another plane, a pair of counterweights on the opposite sides of said end crank arms for partly balancing the unbalanced forces affecting said crankshaft, counterweights opposed to the outer sides of said intermediate crank arms and providing additional weight to balance the unbalanced forces affecting said crankshaft, said crank arms and said counterweights being formed to provide draft clearance on opposite sides of said one plane and on opposite sides of planes parallel to said one plane and extending through the axes of the crankpins of said intermediate crank arms and on opposite sides of planes converging obliquely away from said one plane and intersecting said one plane and said parallel planes at the ends of said crankpins of said intermediate crank arms, said crankshaft also being formed to provide main bearing journal means formed to provide draft clearance on opposite sides of said one plane.

5. A crankshaft for engines comprising end crank arms disposed adjacent the opposite ends of said crankshaft and extending in opposed relation to one another in one plane, intermediate crank arms between said end crank arms and extending in opposed relation to one another in another plane, a driving flange formed at one end of said crankshaft, counterweight means in opposed relation to the opposite sides of said end crank arms, counterweight means opposed to the outer sides of said intermediate crank arms, and counterweight means on the outer peripheral edge of said driving flange, said counterweight means being formed and positioned to balance the unbalanced forces resulting from the rotation of said crankshaft, said crank arms, said driving flange and said counterweight means being formed throughout the length of said crankshaft to provide draft clearance on opposite sides of said one plane and on opposite sides of planes parallel to said one plane and extending through the axes of the crankpins of said intermediate crank arms and on opposite sides of planes converging obliquely away from said one plane and intersecting said one plane and said parallel planes at the ends of said crankpins of said intermediate crank arms, said crankshaft also being formed to provide main bearing journal means formed to provide draft clearance on opposite sides of said one plane.

6. A crankshaft for engines comprising crank arms extending in opposed relation to one another in one plane and crank arms extending in opposed relation to one another in another plane, said first mentioned crank arms being formed to provide draft clearance on opposite sides of said one plane, said second mentioned crank arms being formed to provide draft clearance on opposite sides of surfaces intersecting said one plane and extending in opposite directions through said second mentioned crank arms and the axes of the crankpins of said second mentioned crank arms.

References Cited in the file of this patent
UNITED STATES PATENTS

| | | |
|---|---|---|
| Re. 17,549 | Chase | Dec. 31, 1929 |
| 1,575,239 | Walker | Mar. 2, 1926 |
| 1,726,875 | Yassenoff | Sept. 3, 1929 |
| 1,783,664 | McGovern | Dec. 2, 1930 |
| 1,813,276 | Burtnett | July 7, 1931 |
| 1,898,459 | Newcomb | Feb. 21, 1933 |
| 1,944,013 | Meyer | Jan. 16, 1934 |
| 2,182,988 | Iseler | Dec. 12, 1939 |

(Other references on following page)

UNITED STATES PATENTS

| | | |
|---|---|---|
| 2,284,515 | Criswell | May 26, 1942 |
| 2,303,608 | Campbell | Dec. 1, 1942 |
| 2,426,874 | Hasbrouck | Sept. 2, 1947 |
| 2,452,712 | Olsen | Nov. 23, 1948 |
| 2,632,340 | Dolza | Mar. 24, 1953 |
| 2,680,387 | White et al. | June 8, 1954 |

OTHER REFERENCES

Pattern Maker's Manual (1st ed.), American Foundrymen's Society, Chicago, pages 32, 34, 35, 37 and 154, 1953.

Balance of the Cadillac V-63 Engine, by E. W. Seaholm, S.A.E. Journal, pp. 70–73; vol. XIV, No. 1; January 1924.